Sept. 8, 1942.  E. M. KRATZ  2,294,915
SHEET-MAKING APPARATUS
Original Filed May 19, 1939   2 Sheets-Sheet 1
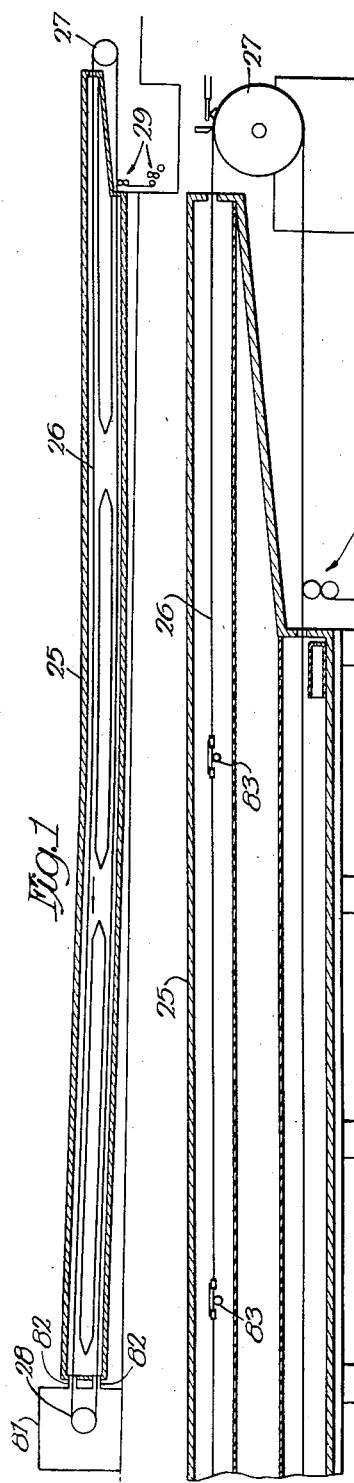
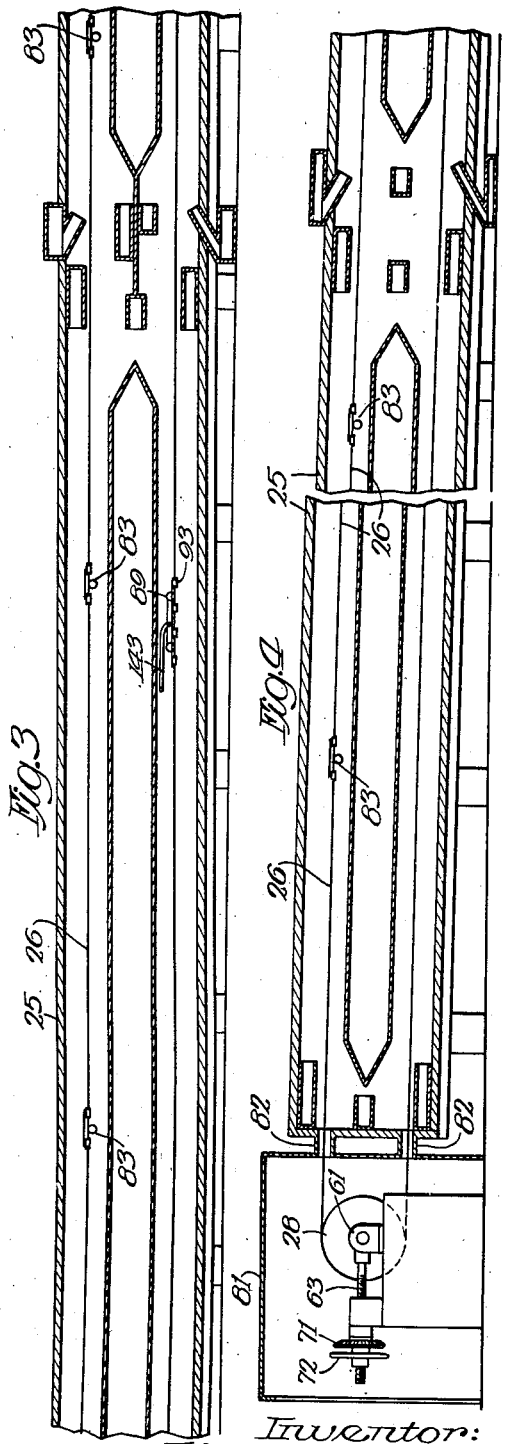
Inventor:
Edouard M. Kratz
By Soans, Pond & Anderson  Attys.

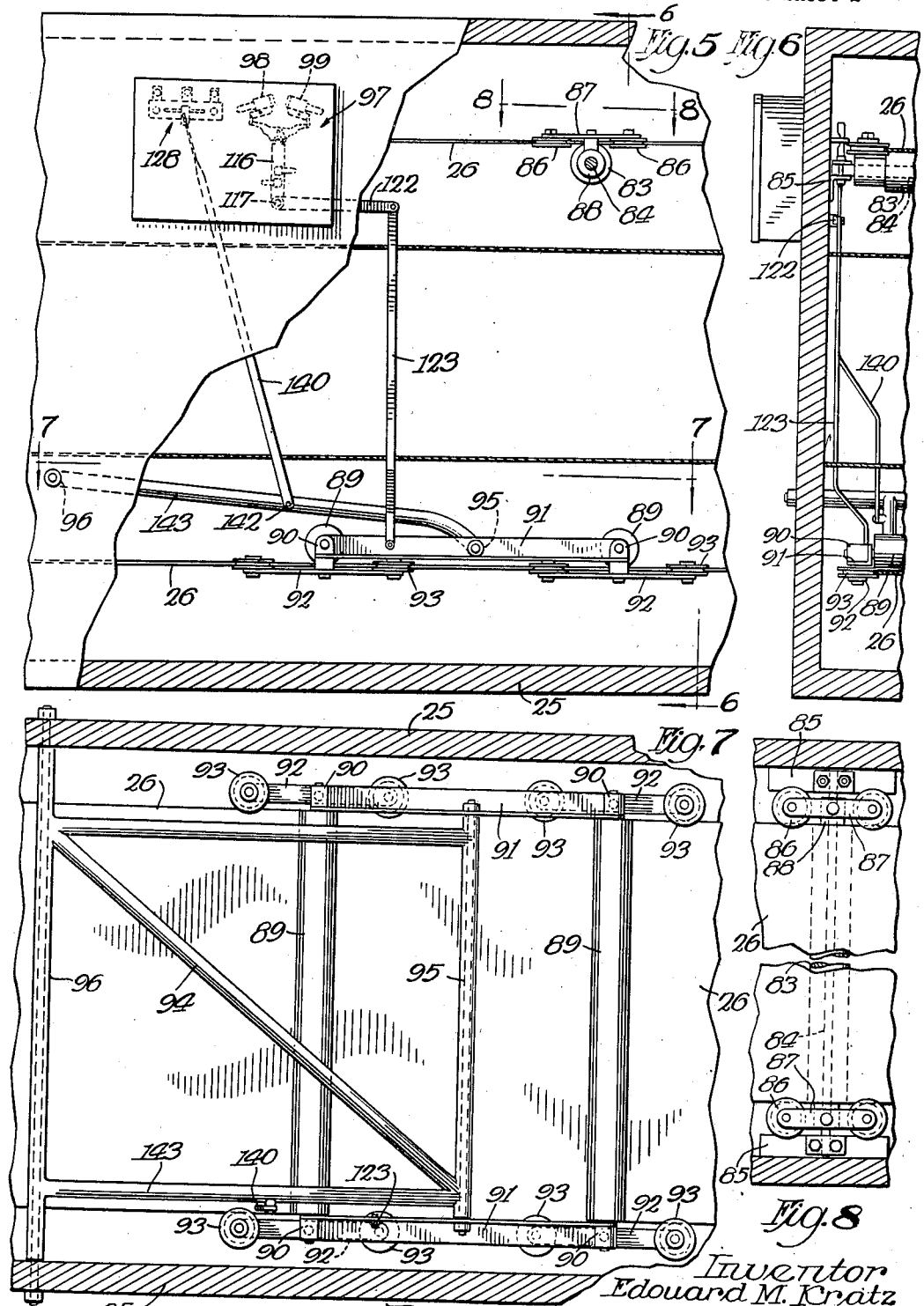

Patented Sept. 8, 1942

2,294,915

UNITED STATES PATENT OFFICE 2,294,915

SHEET MAKING APPARATUS

Edouard M. Kratz, Ogden Dunes, Ind., assignor to Kraft Cheese Company, Chicago, Ill., a corporation of Delaware Original application May 19, 1939, Serial No. 274,481. Divided and this application August 29, 1940, Serial No. 354,642

12 Claims. (Cl. 198—202)

This invention relates to apparatus for making webs or sheets and this application is a division of my co-pending application Serial Number 274,481.

The main objects of this invention are to provide mechanism which will facilitate the production of sheets or webs of uniform thickness; to provide mechanism for automatically controlling the operating condition of mechanism which is subject to variation due to various causes, including changes in temperature; and in general, to provide improved apparatus for the purpose set forth.

Other objects and advantages of the invention will be understood by reference to the following specification and accompanying drawings (two sheets) wherein there is disclosed the improved apparatus of the character indicated.

In the drawings:

Fig. 1 is a diagrammatic representation of the improved sheet forming apparatus;

Figs. 2, 3 and 4 are more or less diagrammatic illustrations on an enlarged scale of various portions of the apparatus as shown in Figure 1;

Fig. 5 is a side elevation, of mechanism for automatically controlling the tautness and curling of a drying belt;

Figs. 6, 7 and 8 are sections, respectively, on the lines 6—6, 7—7 and 8—8 on Fig. 5.

The apparatus herein contemplated is particularly designed for the production of sheet material from casein compositions but the construction herein disclosed may be employed for analogous purposes in the making of sheeting from other compositions. The apparatus is particularly advantageous in any situation where the sheeting is best produced on an imperforate belt of great length on which the sheeting is dried by being passed through an oven and in any instance where uniformity of thickness is difficult of achievement because of a normal tendency of the material from which the sheeting is formed to flow or run on the forming belt.

The apparatus herein shown comprises an elongated oven designated in its entirety 25, the same being preferably built to match the normal catenary curve of an elongated sheet forming belt 26. The belt 26 is, in this instance, of stainless steel or the like having a highly polished or plated outer surface and the belt is supported at its opposite ends by rollers 27 and 28. The roller 27 is the receiving end of the machine to which the composition is delivered to the belt for forming the sheet and the roller 28 is adjustably mounted so as to permit adjustment of the tautness of the belt, so that its catenary curve may be maintained substantially constant, notwithstanding changes in the length of the belt due to expansion or contraction. The sheet formed on the belt is delivered from the lower reach of the belt and wound on suitable reels near the receiving end of the machine by suitable mechanism indicated generally at 29.

The oven 25 is supplied with hot air through suitable inlets and by suitable mechanism as more fully explained in my co-pending application Serial No. 229,509 and suitable outlets and connections to permit recirculation of the air are, of course, contemplated. Inasmuch as these are fully explained in my said co-pending application they will not be detailed herein.

In forming a sheet on the belt or band 26, the sheet forming material is delivered in liquid form to the receiving end of the belt and over such portion of the width thereof as will produce a sheet of the desired width on the band. The width of the sheet to be formed may be varied and it may be controlled by appropriately limiting the volume and flow of the liquid delivered to the belt. The maximum sheet width is preferably somewhat less than the full width of the belt so as to prevent spilling of the liquid over the edges of the belt, and such maximum width may be determined by suitable means such as is shown, for example, in my co-pending application Serial No. 274,481.

The marginal portions of the belt which are left uncovered or bare of the sheet forming liquid as above indicated are subjected to the same oven temperatures as the intermediate portion of the belt, but they are not subjected to the same extent as the intermediate portion to the cooling effect of the sheet forming liquid. Therefore, the marginal and intermediate portions of the belt probably have a tendency to expand and contract at different rates. This difference in the rates of expansion and contraction in the various portions of the belt is probably responsible, at least in part, for a strong tendency of the belt to curl transversely.

Other considerations may also have a bearing on the tendency of the belt to curl, but, whatever the cause, the curling of the belt has been effectively prevented by the means hereinafter described.

Inasmuch as the sheet is formed on the outside surface of the belt 26, it will be understood that on the upper reach of the belt the sheet is located on the upper surface thereof and that on the lower reach of the belt the sheet is on the lower surface thereof. Under these circumstances the upper reach of the belt may be supported from below by means of suitably journalled rollers 83 disposed at such locations as experience shows to be most desirable. In Figures 2, 3, and 4 of the drawings, such supporting rollers are indicated at spaced intervals throughout the length of the oven. Each of the rollers 83 may be supported on a shaft such as 84 which is suitably supported by means of brackets indicated at 85 forming a part of or secured to the oven frame work.

Associated with each of the supporting rollers 83 are grooved rollers 86, 86 journalled on a bracket such as indicated at 87, supported from a bearing member 88 on the shaft 84. Each roller 87 receives in its peripheral groove an edge portion of the belt 26 (see Figures 5 and 6) and thereby serves to maintain the belt flat and in engagement with the roller 83 across the entire width thereof. By this means the normal tendency for the belt to curl transversely is overcome. By thus maintaining the belt flat (and in a substantially horizontal plane), there is no tendency (or at least only a negligible one) for the sheet forming liquid to run on the belt. Hence, the production of sheeting of uniform thickness is facilitated. The bracket 87 is preferably pivotally mounted intermediate its ends on the bearing 88, so that the bracket arm 87 may pivot sufficiently to permit the rollers 86 to bear equally on the edge of the belt 26.

Control of curling tendency of the lower reach of the belt is of less importance than of the upper reach, since the sheet is well set by the time the sheet forming material reaches the rear end of the belt and begins its return travel on the lower reach thereof. However, I have found that control of the lateral position of the belt, or in other words, control of migrating tendencies of the belt, may be advantageously effected by action on the lower reach of the belt. Preferably, such controlling action is effected on the lower reach of the belt at a point located about one-third of the distance from the front end of the apparatus to the rear end thereof. It is to be understood that the stated distance is not critical but it is advantageous in that it effectively maintains the belt within permissible limits of movement crosswise of the receiving end of the drum 27, which limits are somewhat less than corresponding limits on the roll 28 at the rear end of the apparatus.

The mechanism for controlling the belt by action on its lower reach comprises a pair of rollers 89, 89 which extend transversely over and in engagement with the upper surface of the lower reach of the belt 26. Said rollers 89, 89 are equipped with endwise extending shafts which are journalled in suitable bearing members 90, 90 to which are connected angle iron side members 91, 91. The angle iron side members 91 are thus supported by the lower reach of the belt 26 through the agency of the rollers 89, 89. Adjacent each end of each of the side members 91, there are pivoted intermediate their ends, arms 92, each of which has rotatably secured to its ends peripherally grooved rollers 93. The rollers 93 receive in their peripheral grooves the marginal edge portions of the belt 26 so as to maintain the belt flat and in engagement with the surface of the rollers 89, 89 across their entire lengths.

The position of the supporting rollers 89 and of the edge engaging rollers 93 in the direction extending transversely of the widths of the oven 25 is fixed by means of a frame 94 which has a transversely extending bar 95 pivoted at its ends to the adjacent side members 91 approximately mid-way between the ends thereof. The said frame 94 also has a transversely extending member 96 pivoted at its opposite ends to the walls of the oven as best shown in Figure 7, so as to prevent shifting of the frame transversely of the oven chamber. By the same token, the roller supported side members 91 are prevented from shifting transversely and hence, through the edge engaging rollers 93, serve to maintain the belt in a substantially fixed path of travel.

The effective control or prevention of curling of the belt constitutes a most important aid in the production of sheet material of uniform thickness from edge to edge. The control or prevention of lateral shifting or migrating tendencies of the belt by the described means (which also maintain the belt transversely flat) is of substantial importance to the successful and efficient production of sheeting on a belt or band such as described.

Changes in the described apparatus may be made without departing from the spirit of the invention, the scope of which should be determined by reference to the following claims, the same being construed as broadly as possible, consistent with the state of the art.

I claim:

1. In apparatus of the class described, the combination of an elongated conveyor belt, means for supporting said conveyor belt adjacent its opposite ends, and guide means supported by said conveyor belt for maintaining the same in a predetermined path of travel.

2. In apparatus of the class described, the combination of an elongated conveyor belt, means for supporting said belt at its opposite ends, and means intermediate the length of the belt for preventing curling thereof transversely of its length, said means comprising a pair of rolls extending transversely of the belt but spaced longitudinally thereof and engaging the side thereof, which tends to become convexed, frame members for rotatably supporting said roll, and grooved wheels carried by said frame members and engaging the opposite edges of said belt, said grooved wheels and roll being so related as to maintain the belt in substantially flat condition transversely of its length.

3. In apparatus of the class described, the combination of an elongated conveyor belt, means for supporting said belt at its opposite ends, means intermediate the length of the belt for preventing curling thereof transversely of its length, said means comprising a roll extending transversely of the belt and engaging the side thereof which tends to become convexed, a pair of arms respectively adjacent the ends of said roll and extending transversely thereof and peripherally grooved wheels rotatably mounted on the ends of said arms for engaging the edges of the belt so as to thereby maintain the belt in transversely flat condition and in engagement with the entire length of said roll, said transversely extending arms being pivotally mounted intermediate their ends whereby the pressure of said wheels on the edges of said belt is equalized.

4. In apparatus of the class described, the combination of an elongated conveyor belt, means for supporting said belt at its opposite ends, and means intermediate the length of the belt for preventing curling thereof transversely of its length, said means comprising a pair of rolls extending transversely of the belt but spaced longitudinally thereof and engaging the side thereof which tends to become convexed, side members connecting said rolls and supported thereby, arms extending transversely of said rolls adjacent each of the ends thereof, peripherally grooved wheels rotatably mounted on the ends of said arms and adapted to engage the edges of said belt so as to thereby hold said belt in transversely flat condition and in engagement with the entire lengths of said rolls, said arms being pivotally mounted intermediate their ends so as to effect equalization of the pressure of the wheels at opposite ends of the arms on the edges of the belt.

5. In apparatus of the class described, the combination of an elongated conveyor belt, means for supporting said belt at its opposite ends, means intermediate the length of the belt for resisting curling thereof and operative to maintain the belt in a predetermined path of travel, said means comprising a roll extending transversely of the belt on the side thereof which tends to become convexed, side frames carried by the opposite ends of said roller, a plurality of peripherally grooved rollers carried by said side frames and adapted to engage the opposite edges of said belt, and means for maintaining said rollers in substantially fixed, lateral position so as to thereby prevent lateral shifting of the belt.

6. In apparatus of the class described, the combination of an elongated conveyor belt, means for supporting said belt at its opposite ends, an enclosure through which said belt is adapted to travel, means intermediate the length of the belt for resisting curling thereof and operative to maintain the belt in a predetermined path of travel, said means comprising a roll extending transversely of the belt on the side thereof which tends to become convexed, side frames carried by the opposite ends of said roller, a plurality of peripherally grooved rollers carried by said side frames and adapted to engage the opposite edges of said belt, and means for maintaining said rollers in substantially fixed lateral position so as to thereby prevent lateral shifting of the belt, said means comprising an elongated arm pivoted adjacent one end to one of said side frames and at its other end to a portion of said enclosure.

7. In apparatus of the class described, the combination of an elongated conveyor belt, means for supporting said belt at its opposite ends, means intermediate the length of the belt for resisting curling thereof and operative to maintain the belt in a predetermined path of travel, said means comprising a roll extending transversely of the belt on the side thereof which tends to become convexed, supports associated with the opposite ends of said roll, peripherally grooved rollers carried respectively by said supports and adapted to engage the opposite edges of said belt, and means for maintaining said rollers in substantially fixed, lateral position so as to thereby prevent lateral shifting of the belt.

8. In apparatus of the class described, the combination of an elongated conveyor belt, means for supporting said belt at its opposite ends, and means intermediate the length of the belt for preventing curling thereof transversely of its length, said means comprising an element extending transversely of the belt on the side thereof which tends to become convexed, arm members pivotally mounted intermediate their ends, extending transversely of said element and respectively disposed adjacent the opposite edges of said belt, and pairs of flanged wheels rotatably mounted on each of said arms and respectively on opposite sides of the arm pivot, said flanged wheels being adapted to engage the opposite edge portions of said belt on the side thereof which tends to become concaved and respectively disposed forwardly and rearwardly of said element, said element and said flanged wheels being so related as to maintain the belt in substantially flat condition transversely of its length.

9. In apparatus of the class described, the combination of an elongated conveyor belt, means for supporting said belt at its opposite ends, and means intermediate the length of the belt for preventing curling thereof transversely of its length, said means comprising a roll extending transversely of the belt on the side thereof which tends to become convexed, arm members pivotally mounted intermediate their ends, extending transversely of said roll and respectively disposed adjacent the opposite edges of said belt, and pairs of flanged wheels rotatably mounted on each of said arms and respectively on opposite sides of the arm pivot, said flanged wheels being adapted to engage the opposite edge portions of said belt on the side thereof which tends to become concaved and respectively disposed forwardly and rearwardly of said roll, said roll and said flanged wheels being so related as to maintain the belt in substantially flat condition transversely of its length.

10. In apparatus of the class described, the combination of an elongated conveyor belt, means for supporting said belt at its opposite ends, said belt being of such length and weight as to assume a substantial catenary intermediate its end supports, means for depositing material on the outside of said belt, means intermediate the length of the belt for maintaining the belt in a predetermined path of travel, said means comprising a roll extending transversely of the belt on the inside thereof, a pair of flanged wheels respectively adapted to engage the opposite edges of said belt and having their flanges projecting over marginal portions of the belt on the outside thereof, and means for mounting said roll and wheels in substantially fixed position transversely of the normal path of travel of said belt.

11. In apparatus of the class described, the combination of an elongated conveyor belt, means for supporting said belt at its opposite ends, said belt being of such length and weight as to assume a substantial catenary intermediate its end supports, means for depositing material on the outside of said belt, means intermediate the length of the belt for maintaining the belt in a predetermined path of travel, said means comprising a roll extending transversely of the belt on the inside thereof, a pair of flanged wheels respectively adapted to engage the opposite edges of said belt and having their flanges projecting over marginal portions of the belt on the outside thereof, and means for mounting said roll and wheels in substantially fixed position transversely of the normal path of travel of said belt and for movement with the belt incident to changes in its catenary.

12. In apparatus of the class described, a pair of rolls, an endless conveyor belt supported by said pair of rolls, said belt being of such length and weight as to assume a substantial catenary intermediate said supporting rolls, means for driving said belt, and means for preventing edgewise creeping of the belt on its supporting rolls, comprising a member adapted to engage an edge of the belt, said member being disposed in substantially spaced relation to said supporting rolls, and means for preventing transverse buckling of the belt incident to engagement thereof with said edge engaging member.

EDOUARD M. KRATZ.